United States Patent
Hu et al.

(10) Patent No.: US 12,224,421 B2
(45) Date of Patent: Feb. 11, 2025

(54) METHOD OF ROLLING ELECTRODE

(71) Applicant: LG Energy Solution, Ltd., Seoul (KR)

(72) Inventors: Young In Hu, Daejeon (KR); Kyu Bok Yeon, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 552 days.

(21) Appl. No.: 17/493,272

(22) Filed: Oct. 4, 2021

(65) Prior Publication Data

US 2022/0140309 A1 May 5, 2022

(30) Foreign Application Priority Data

Nov. 5, 2020 (KR) .................. 10-2020-0146985

(51) Int. Cl.
| | |
|---|---|
| H01M 4/04 | (2006.01) |
| B29C 55/18 | (2006.01) |
| H01M 4/139 | (2010.01) |
| H01M 10/0587 | (2010.01) |

(52) U.S. Cl.
CPC .......... *H01M 4/0435* (2013.01); *B29C 55/18* (2013.01); *H01M 4/139* (2013.01); *H01M 10/0587* (2013.01)

(58) Field of Classification Search
CPC ............... H01M 4/0435; H01M 4/139; H01M 10/0587; B29C 55/18
USPC ....................................... 29/623.1
See application file for complete search history.

(56) References Cited

U.S. PATENT DOCUMENTS

| | | | |
|---|---|---|---|
| 5,142,891 A | 9/1992 | Kuwano | |
| 2016/0118642 A1* | 4/2016 | Enokihara | H01G 11/86 156/60 |

FOREIGN PATENT DOCUMENTS

| | | | | |
|---|---|---|---|---|
| EP | 3025798 A1 | 6/2016 | | |
| JP | 5609560 B2 | 10/2014 | | |
| JP | 2016112872 A | 6/2016 | | |
| KR | 950009911 B1 | 9/1995 | | |
| KR | 100273949 B1 | 12/2000 | | |
| KR | 20130139490 A | * 12/2013 | ......... | H01M 4/0435 |
| KR | 101435030 B1 | 8/2014 | | |
| KR | 101762017 B1 | 8/2017 | | |
| KR | 20180068520 A | 6/2018 | | |
| KR | 102002953 B1 | 7/2019 | | |
| KR | 20200023900 A | 3/2020 | | |

OTHER PUBLICATIONS

English Language Machine Translation of "Rolling Machine for Electrode Sheet and Method Controlling Thickness of Electrode Sheet by Using the Same", By Kim Deog Hun in KR20130139490(A) (Year: 2013).*

* cited by examiner

*Primary Examiner* — Jonathan G Jelsma
*Assistant Examiner* — Omar M Kekia
(74) *Attorney, Agent, or Firm* — Lerner David LLP

(57) ABSTRACT

The present invention relates to a method of rolling an electrode including a speed-changing rolling section, including: a step of inputting an electrode to a rolling device including at least one pair of rolling rolls; and a step of automatically adjusting a space between the rolling rolls according to a space compensation value between the rolling rolls according to a rolling speed change.

14 Claims, 10 Drawing Sheets

FIG. 5

METHOD OF ROLLING ELECTRODE

CROSS-REFERENCE TO RELATED APPLICATIONS

This application claims the benefit of priority based on Korean Patent Application No. 10-2020-0146985, filed on Nov. 5, 2020, the entire contents of which are incorporated herein by reference.

TECHNICAL FIELD

The present invention relates to a method of rolling an electrode, and more specifically, to a method of rolling an electrode capable of adjusting the space between rolling rolls to be constant by using a rolling speed-rolling space compensation value table.

BACKGROUND TECHNOLOGY OF THE INVENTION

Recently, secondary batteries capable of charging and discharging have been widely used as energy sources of wireless mobile devices. In addition, the secondary battery has attracted attention as an energy source of an electric vehicle, a hybrid electric vehicle, etc., which are proposed as a solution for air pollution of existing gasoline vehicles and diesel vehicles using fossil fuel. Therefore, the types of applications using the secondary battery are currently much diversified due to the advantages of the secondary battery, and it is expected that the secondary battery will be applied to many fields and products in the future.

Such secondary batteries may be classified into lithium ion batteries, lithium ion polymer batteries, lithium polymer batteries, etc., depending on the composition of the electrode and the electrolyte, and among them, the amount of use of lithium-ion polymer batteries that are less likely to leak electrolyte and are easy to manufacture is on the increase. In general, secondary batteries are classified into cylindrical batteries and prismatic batteries in which an electrode assembly is embedded in a cylindrical or rectangular metal can, depending on the shape of a battery case, and pouch-type batteries in which the electrode assembly is embedded in a pouch-type case of an aluminum laminate sheet. The electrode assembly built into the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between the positive electrode and the negative electrode which are long sheet-shaped and are coated with active materials, and a stack type in which a plurality of positive electrodes and negative electrodes of a predetermined size are sequentially stacked while a separator is interposed therebetween.

The positive electrode and the negative electrode are formed by applying a positive electrode slurry containing a positive electrode active material and a negative electrode slurry containing a negative electrode active material to a positive electrode current collector and a negative electrode current collector, followed by drying and rolling them.

FIG. 1 is a schematic diagram showing a general rolling process of an electrode.

Referring to FIG. 1, an electrode 1 has a structure in which an electrode active material layer 3 is formed on a current collector 2, and the electrode is inserted into a space between a pair of rolling rolls 4 to be rolled.

At this time, in order to maintain the uniform quality of the electrode, it is important to maintain the uniform thickness of the electrode after rolling, and in order to maintain the uniform thickness of the electrode after rolling, the space (d) between the rolling rolls should be maintained constant.

In the past, in order to maintain the uniform thickness, the thickness of the electrode after rolling was measured using a thickness measuring instrument, and the space between the rolling rolls was controlled based thereon. However, in this case, since only the section, where the electrode is moved at a constant speed, can be measured, in the case that the rolling speed is changed, it was impossible to correct the space between the rolling rolls. Further, in this case, if reaching the constant-speed rolling section after the rolling speed change, several times of corrections of the space between the rolling rolls are necessary to reach the targeted thickness, which may cause a problem in the initial electrode quality.

DESCRIPTION OF THE INVENTION

Technical Problem

The present invention has been devised to solve the above problem, and an object of the present invention is to provide a method of rolling an electrode capable of improving the quality of the electrode by maintaining the thickness of the electrode constant by maintaining the space between rolling rolls constant in changing the rolling speed of the electrode.

Technical Solution

The present invention relates to a method of rolling an electrode including a speed-changing rolling section, including: a step of inputting an electrode to a rolling device including at least one pair of rolling rolls; and a step of automatically adjusting a space between the rolling rolls according to a space compensation value between the rolling rolls according to a rolling speed change.

At this time, the space compensation value between the rolling rolls may be determined from a rolling speed-rolling space compensation value table.

In a specific example, in an acceleration section where a rolling speed of the rolling rolls increases, a space between the rolling rolls may be made to decrease by a first space compensation value, and in a deceleration section where the rolling speed of the rolling rolls decreases, the space between the rolling rolls may be made to increase by a second space compensation value.

In a specific example, the rolling speed-rolling space compensation value table may include space compensation values between rolling rolls for one or more acceleration sections and one or more deceleration sections of the rolling rolls.

Further, the rolling speed-rolling space compensation value table may further include a space compensation value between rolling rolls for rolling speed changes of the rolling rolls caused by a job performed during the rolling.

Further, the rolling speed-rolling space compensation value table may further include a space compensation value between the rolling rolls according to a model of an electrode.

At this time, the electrode may be different in at least any one of a temperature and dryness, a coating pattern of an electrode active material, a loading amount of the electrode active material, composition of an electrode active material layer, a thickness and porosity.

Further, the rolling speed-rolling space compensation value table may further include a space compensation value for the at least one pair of rolling rolls.

In a specific example, the rolling speed-rolling space compensation value table may be derived by: manufacturing an electrode sample; changing a rolling speed of the electrode sample while rolling the electrode sample; measuring a space between rolling rolls according to a rolling speed change and building a database therefrom; and setting a compensation value for obtaining a targeted space from the database.

Further, the method for rolling an electrode according to the present invention may further include a step of measuring a space between rolling rolls by changing the rolling speed, and building the database therefrom.

Further, the method for rolling an electrode according to the present invention may further include a step of manufacturing electrode samples by models of the electrode and setting a compensation value therefrom.

Meanwhile, the space compensation value between the rolling rolls may be determined by selecting a rolling speed-rolling space compensation value table corresponding to a model of an electrode, and calculating compensation values according to rolling speeds before and after the rolling speed change in the rolling speed-rolling space compensation value table.

In another example, the electrode in the method for rolling the electrode according to the present invention may further include a constant-speed rolling section, and the method may further include a step of correcting a space between the rolling rolls in the constant-speed rolling section.

Specifically, the step of correcting the space between the rolling rolls in the constant-speed rolling section may include measuring a thickness of the electrode and correcting the space between the rolling rolls by a difference between the measured thickness and a targeted thickness when the measured thickness is different from the targeted thickness.

Advantageous Effects

According to the method of rolling an electrode of the present invention, when changing the rolling speed using a rolling speed-rolling space compensation value table, an appropriate compensation value may be selected from the table, and the compensation value may be applied to the control of the space between the rolling rolls. As such, it is possible to maintain the space between the rolling rolls constant in changing the rolling speed of the electrode. As a result, the quality of the electrode can be improved by uniformly maintaining the thickness of the electrode.

BRIEF DESCRIPTION OF THE DRAWINGS

FIG. 5 is a schematic view of an example of a rolling speed-rolling space compensation value table according to the present invention.

FIG. 7($b$) is a graph showing the rolling speed of an electrode and the thickness of the electrode according to the example of FIG. 7($a$) utilizing the rolling speed-rolling space compensation value table of the present invention.

FIG. 9($b$) is a graph showing the rolling speed of an electrode and the thickness of the electrode according to the example of FIG. 9($a$) utilizing the rolling speed-rolling space compensation value table of the present invention.

BEST MODE FOR CARRYING OUT THE INVENTION

Figure 1:
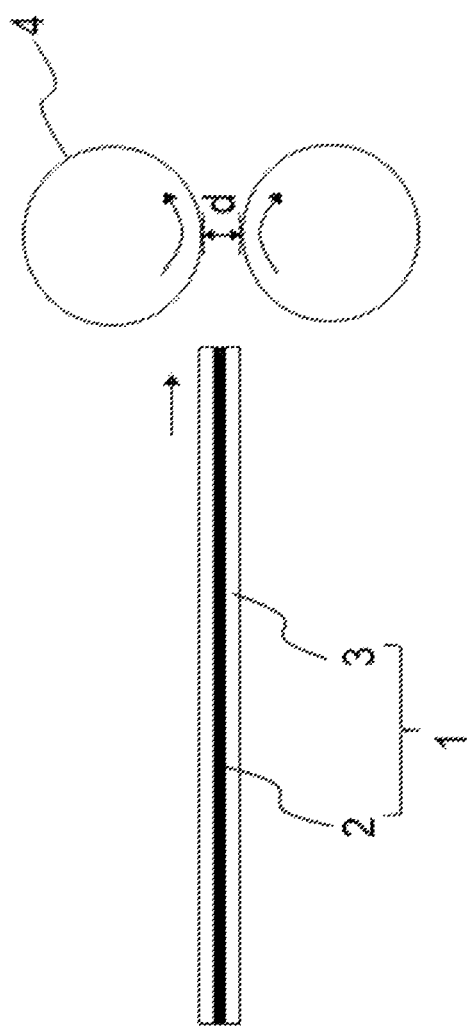
FIG. 1 is a schematic diagram showing a general rolling process of an electrode.

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail with reference to the drawings.

The present invention relates to a method of rolling an electrode including a speed-changing rolling section, including: a step of inputting an electrode to a rolling device including at least one pair of rolling rolls; and a step of automatically adjusting a space between the rolling rolls according to a space compensation value between the rolling rolls according to a rolling speed change.

As described above, in the past, in order to maintain the uniform thickness, the thickness of the electrode after rolling was measured using a thickness measuring instrument, and the space between the rolling rolls was controlled based thereon. However, in this case, since only the section, where the electrode is moved at a constant speed, can be measured, in the case that the rolling speed is changed, it was impossible to correct the space between the rolling rolls. Further, in this case, if reaching the constant-speed rolling section after the rolling speed change, several times of corrections of the space between the rolling rolls are necessary to reach the targeted thickness, which may cause a problem in the initial electrode quality.

According to the present invention, when changing the rolling speed using a rolling speed-rolling space compensation value table, an appropriate compensation value may be selected from the table, and the compensation value may be applied to the control of the space between the rolling rolls. As such, it is possible to maintain the space between the rolling rolls constant in changing the rolling speed of the electrode. As a result, the quality of the electrode can be improved by uniformly maintaining the thickness of the electrode.

Hereinafter, each step of the method of rolling an electrode according to the present invention will be described in detail.

Figure 2:
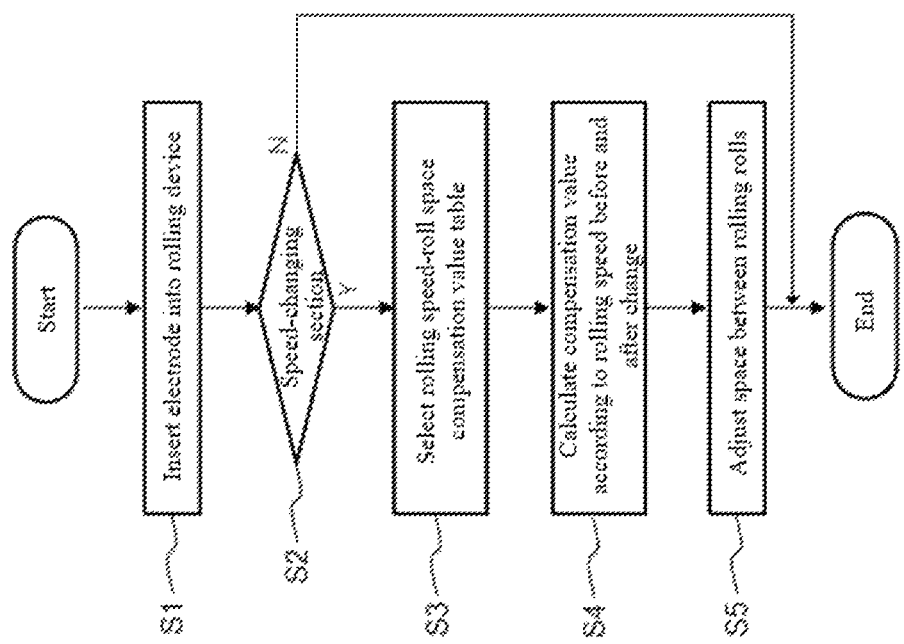
FIG. 2 is a flowchart showing the procedure of a method of rolling an electrode according to an embodiment of the present invention.
Figure 3:
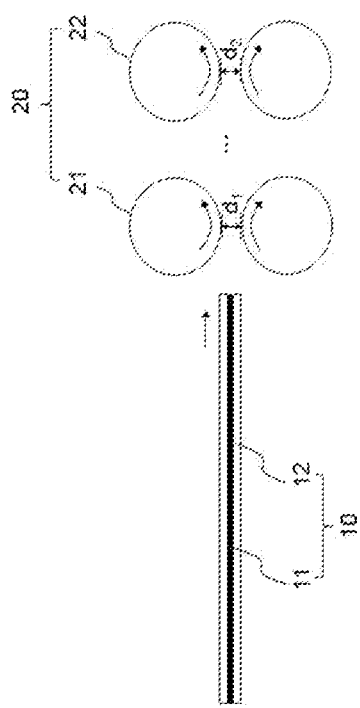
FIG. 3 is a schematic diagram showing the rolling process of an electrode according to the present invention.

FIG. 2 is a flowchart showing the procedure of a method of rolling an electrode according to an embodiment of the present invention, and FIG. 3 is a schematic diagram showing the rolling process of an electrode according to the present invention.

Referring to FIGS. 2 and 3, first, an electrode is inserted into a rolling device (S1).

The electrode may have a structure where an electrode active material layer 12 is formed by applying an electrode slurry including an electrode active material on the current collector 11 and drying the electrode slurry.

The current collector may be a positive electrode current collector or a negative electrode current collector, and the electrode active material may be a positive electrode active material or a negative electrode active material. In addition, the electrode slurry may further include a conductive material and a binder in addition to the electrode active material.

In the present invention, the positive electrode collector generally has a thickness of 3 to 500 micrometers. The positive electrode current collector is not particularly limited to this range as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited to this range as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0<x \leq 1$; $1 \leq y \leq 3$; $1 \leq z \leq 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited to this range as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, the rolling device 20 may include at least one pair of rolling rolls and may specifically include two or more pairs of rolling rolls 21 and 22. FIG. 3 illustrates that a rolling roll includes two pairs of rolling rolls. Herein, a rolling roll at the front region is defined as a first rolling roll 21, and a rolling roll at the rear region is defined as a second rolling roll 22. Each pair of rolling rolls 21 and 22 may include an upper roll for pressing the electrode 10 from the upper portion and a lower roll for pressing the electrode from the lower portion. The electrode 10 is inserted into a space between the upper roll and the lower roll.

When the electrode 10 is inserted into a rolling device 20, the rolling rolls 21 and 22 roll the electrode. In the present invention, the rolling device 20 may repeat the rolling process two or more times by including two or more pairs of rolling rolls 21 and 22.

At this time, the electrode may be rolled at a predetermined rolling speed. At this time, the rolling speed means a speed at which the electrode moves between rolling rolls, and the rolling speed can be adjusted according to the rotation speed of the rolling rolls.

The rolling speed is changed for various reasons during the rolling process, and the method of rolling an electrode according to the present invention includes a constant-speed rolling section and a speed-changing rolling section. Herein, the speed-changing rolling section includes an acceleration section where the rolling speed gradually increases and a deceleration section where the rolling speed gradually decreases.

Figure 4:
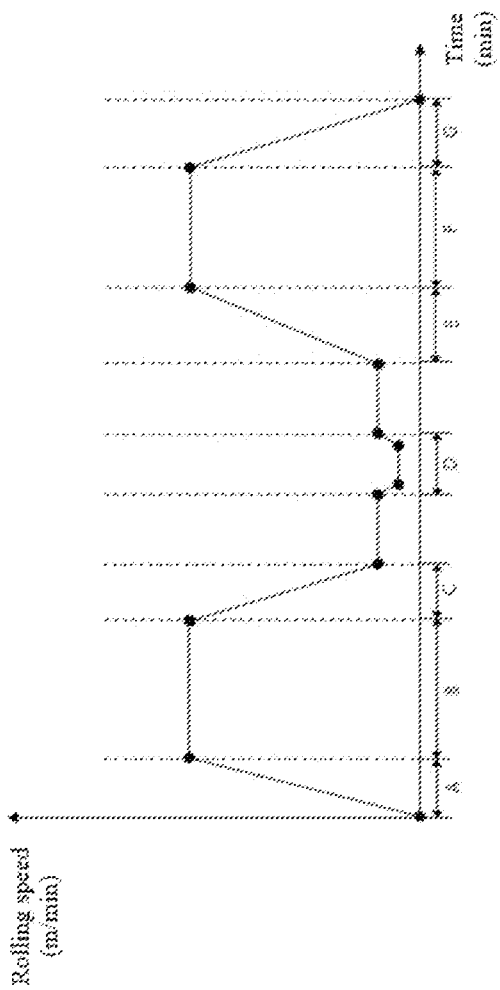
FIG. 4 is a graph showing an example of a rolling speed change over time in a process of rolling an electrode according to the present invention.

FIG. 4 is a graph showing an example of a rolling speed change over time in a process of rolling an electrode according to the present invention.

Referring to FIG. 4, for example, when an electrode is inserted into a space between rolling rolls, the rolling speed may be increased until reaching a targeted rolling speed (acceleration section, section A). Thereafter, when reaching a targeted rolling speed, the constant-speed rolling section (section B) is maintained. Further, the rolling speed may be changed by a job which may be performed during the rolling process. For example, it is possible to replace or splice the electrode roll during the rolling process, or reduce the rolling speed for a job during the rolling when the maintenance of other facilities is necessary (deceleration section, section C). Further, the rolling speed may be further reduced during the job operation (job section, section D), and when the job is completed, the rolling speed may be increased until reaching the targeted rolling speed (acceleration section, section E). Thereafter, when reaching a targeted rolling speed again, the constant-speed rolling section (section F) is maintained, and when the rolling is terminated, the rolling speed decreases (deceleration section, section G).

Likewise, in the rolling process, the constant-speed rolling section and the speed-changing rolling section such as acceleration section/deceleration section are repeatedly shown. At this time, when using a conventional thickness measuring instrument, it is possible to measure the thickness of the electrode in the constant-speed rolling section, but it is impossible to measure the thickness of the electrode in the speed-changing rolling section. Further, in the speed-changing rolling section, there comes to be a change in the pressing force applied to the electrode due to the speed change of the rolling roll, which causes a difference in the thickness of the electrode. As such, in order to maintain the thickness of the electrode constant in the speed-changing rolling section, it is necessary to automatically adjust the space between rolling rolls.

The present invention further includes a step of automatically adjusting a space between the rolling rolls according to a space compensation value between the rolling rolls according to a rolling speed change.

The space compensation value between the rolling rolls may be determined from a rolling speed-rolling space compensation value table. The rolling speed-rolling space compensation value table means a table where space compensation values between rolling rolls according to rolling conditions are derived.

Specifically, in an acceleration section where a rolling speed increases, a space between the rolling rolls is made to decrease by the space compensation value. This is to maintain the thickness of the electrode constant by reducing the space between rolling rolls because the pressing force applied to the rolling rolls decreases in the acceleration section. On the contrary, since the pressing force applied to the rolling rolls increases in the deceleration section where the rolling speed decreases, the space between the rolling rolls is made to increase to thereby reduce the force applied to the electrode.

Figure 5:
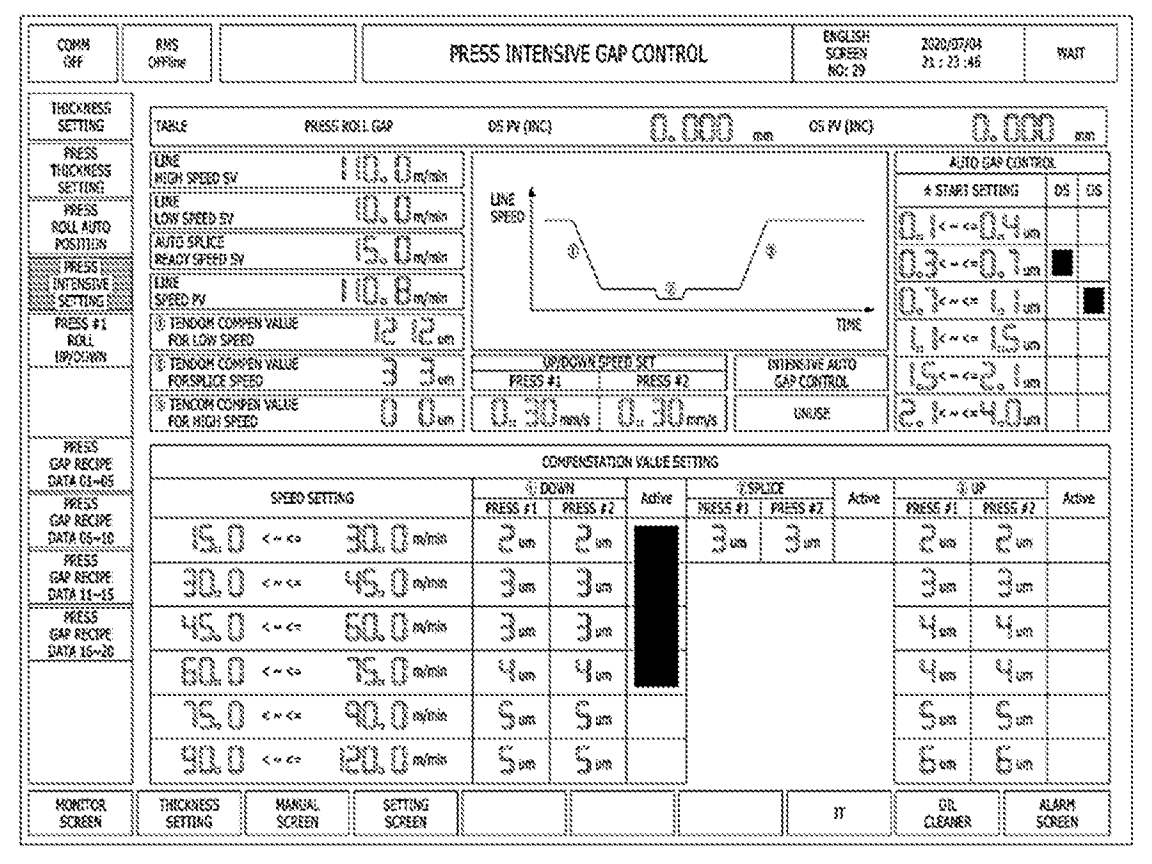

FIG. 5 is a schematic view of an example of a rolling speed-rolling space compensation value table according to the present invention.

Referring to FIG. 5, the rolling speed-rolling space compensation value table may include space compensation values between rolling rolls, which are applied by specific rolling speed sections in the acceleration section and the deceleration section.

Referring to FIG. 5, in the rolling speed-rolling space compensation value table, space compensation values between rolls according to the acceleration section and the deceleration section are derived. More specifically, in the rolling speed-rolling space compensation value table, the space compensation values between the rolling rolls according to the initial speed and the final speed according to whether a section is an acceleration section or a deceleration section are derived. Further, the rolling speed-rolling space compensation value table may include compensation values by respective rolling speed sections by specifically dividing the acceleration section and the deceleration section in order to increase accuracy of the compensation value. For example, when the minimum rolling speed is 15 m/min and the maximum rolling speed is 120 m/min, the rolling speed section between 15 m/min and 120 m/min may be divided by 15 m/min units, to thereby derive the speed compensation amount by rolling speed sections. At this time, the size of the rolling speed section may be appropriately set by one of ordinary skill in the art. Further, in FIG. 5, the portion indicated by "DOWN" means the compensation value, and the portion indicated by "UP" means the compensation value of the acceleration section. The method of calculating the compensation value according a specific rolling speed is more fully described below.

Further, the rolling speed-rolling space compensation value table further includes a space compensation value between rolling rolls, which is applied when the rolling speed is changed by a job which is performed during the rolling. As described above, some examples of the job performed during the rolling may include replacement of an electrode roll, splicing, and maintenance of a rolling facility. Likewise, when a job is performed during the rolling, the rolling speed needs to be reduced. In the rolling speed-rolling space compensation value table according to the present invention, the change in the thickness of the electrode may be minimized by including space compensation values between rolling rolls which are applied during the rolling speed change in the corresponding job section in consideration of the job which may be performed during the rolling. In FIG. 5, the portion indicated by "SPLICE" is a portion where the compensation value is indicated when changing the speed for the electrode roll replacement operation.

The rolling speed-rolling space compensation value table further includes a space compensation value between the rolling rolls according to a model of an electrode. Specifically, the electrode may be different in at least one of a temperature and dryness, a coating pattern of an electrode active material, a loading amount of the electrode active material, composition of an electrode active material layer, a thickness and porosity, when the electrode is rolled by models. When manufacturing conditions such as the temperature and dryness at the time of rolling, and a coating pattern of the electrode active material are different or the specification of the electrode such as the loading amount of the electrode active material, and the composition, thickness and porosity of the electrode active material layer is different, the space between the rolling rolls needs to be adjusted accordingly. In the present invention, the desired quality of the electrode may be obtained by separately setting the space compensation value between rolling rolls according to the model of the electrode.

Further, as described above, the rolling device according to the present invention may include two or more pairs of rolling rolls. In this case, the rolling speed-rolling space compensation value table may further include a space compensation value by rolling rolls. The precision of the roll space compensation may be further improved by setting a compensation value for each of the plurality of rolling rolls.

Referring to FIGS. 3 and 5, for example, the roll space compensation value of the first rolling roll 21 may be shown in "PRESS #1", and the roll space compensation value of the space compensation value 22 may be shown in "PRESS #2". As shown in FIG. 5, the roll space compensation values in the first rolling roll 21 and the second rolling roll 22 may be the same, but the roll space compensation values in the first rolling roll 21 and the second rolling roll 22 may be different depending on the process condition.

Meanwhile, the rolling speed-rolling space compensation value table may be derived by a method of a design of experiments. Namely, the rolling speed-rolling space compensation value table may be determined by a value which is derived by repeated experiments. Specifically, the rolling speed-rolling space compensation value table may be derived through: a process of manufacturing an electrode sample; a process of changing a rolling speed of the electrode sample while rolling the electrode sample; a process of measuring a space between rolling rolls according to a rolling speed change and building a database therefrom; and a process of setting a compensation value for obtaining a targeted space from the database. This includes a process of changing the rolling speed when a job is performed during the roll, building a database and setting a compensation value therefrom.

More specifically, the method of rolling an electrode according to the present invention may further include a process of measuring the space between rolling rolls by using different rolling speeds before the change and after the change, and building a database therefrom in order to derive a rolling speed-rolling space compensation value table. For example, as in FIG. 5, it is possible to measure the change in the space between rolling rolls while changing the rolling speed by specific sections and derive the roll space compensation value for maintaining the space between the rolling rolls therefrom.

Herein, building a database includes performing a process of measuring the space between rolling rolls while changing the rolling speed according to the same speed before change and speed after change. This is to recognize the tendency shown by the change in the space between the rolling rolls according to the change in the rolling speed and derive the optimal roll space compensation value therefrom. Likewise, the measured data can be accumulated in a storage system such as a memory, and can be recorded as visual data such as tables or graphs. The visual data may be utilized to derive the optimal compensation value, and in order to improve the accuracy, it is preferable to perform measurement as many times as possible.

Likewise, deriving the roll space compensation value may be optimized through several experimental measurements due to the characteristic of the electrode having a structure in which a heterogeneous material is bonded. Namely, since the electrode has a structure in which the electrode active material is applied on the current collector of the metal material, the change in the physical properties of the subject of rolling is irregular according to the rolling. As such, the most accurate roll space compensation value may be derived by repeating the experimental measurement process.

Further, since the physical properties may be different, the present invention may further include a process of preparing electrode samples for different electrode models and setting the compensation value therefrom. Namely, the rolling speed-rolling space compensation value table may be derived through the process of preparing an electrode sample according to the model, changing the rolling speed of the electrode sample, measuring the space between the rolling roll and the electrode according to the rolling speed change, and building a database therefrom, and setting a compensation value for achieving a targeted space from the database.

The rolling speed-rolling space compensation value table may be derived in advance before rolling the electrode.

As described above, if the rolling is started by inserting an electrode into a rolling device (S1), the constant-speed rolling section and the speed-changing rolling section may be repeated. At this time, when the electrode reaches the speed-changing rolling section where the rolling speed changes (S2), the space between the rolling rolls is automatically adjusted according to the space compensation value between the rolling rolls according to the rolling speed change. Specifically, the space compensation value between the rolling rolls may be determined by a process of selecting (S3) a rolling speed-rolling space compensation value table corresponding to a model of an electrode, and calculating (S4) compensation values according to rolling speeds before and after the rolling speed change in the rolling speed-rolling space compensation value table. Thereafter, the space between the rolling rolls is automatically adjusted according to the calculated compensation value (S5). The space between the rolling rolls may be performed according to a known method. For example, the rolling rolls may be adjusted by vertical movements by a hydraulic scheme.

At this time, since the rolling speed-rolling space compensation value table according to the present invention has a form in which the compensation value has been derived by specific sections, the space compensation value between the rolling rolls may be calculated in a scheme that the compensation values by specific sections are summed. For example, in FIG. 5, if the speed before change is 75 m/min and the speed after change is 15 m/min, 12 µm, which is obtained by summing compensation values (2 µm, 3 µm, 3 µm, and 4 µm) by specific sections, may be determined as the compensation value. Further, in this case, since this corresponds to the deceleration section, the space between the rolling rolls may be increased to 12 µm.

Meanwhile, if the rolling speed before the change or the rolling speed after the change does not coincide with the lower limit value or the upper limit value of a specific section shown in the table, the compensation value may be determined as the compensation value of a specific section including the speed before the change or the speed after the change. For example, in FIG. 5, when the rolling speed is reduced from 110 m/min to 40 m/min, the speed before the change and the speed after the change do not coincide with the upper limit value or the upper limit value (15, 30, 45, 60, 75, 90 and 120 m/min) of the specific section of FIG. 5. In this case, the compensation value when the rolling speed is changed from 110 m/min to 90 m/min may be determined as 5 μm which is the same as the compensation value when the rolling speed is changed from 120 m/min to 90 m/min, and the compensation value when the rolling speed is changed from 45 m/min to 40 m/min may be determined as 3 μm which is the same as the compensation value when the rolling speed is changed from 45 m/min to 30 m/min. Hence, if the rolling speed is reduced from 110 m/min to 40 m/min, the compensation value may be determined as 20 μm, which is obtained by summing compensation values (3 μm, 3 μm, 4 μm, 5 μm and 5 μm) by specific sections.

Further, when the electrode roll replacement operation is performed, in FIG. 5, the compensation value is 3 μm, and since the rolling speed is reduced during the electrode roll replacement operation, the space between the rolling rolls may be increased by 3 μm.

Such a process may be performed, for example, by software, to which a rolling speed-rolling space compensation value table has been input, and a control device including the same.

Meanwhile, in another example, the method of rolling an electrode according to the present invention may further include a step of correcting a space between rolling rolls in a constant-speed rolling section. At this time, the step of correcting the space between the rolling rolls in the constant-speed rolling section may include a process of measuring a thickness of the electrode and correcting the space between the rolling rolls by a difference between the measured thickness and a targeted thickness when the measured thickness is different from the targeted thickness. Namely, in the case of a constant speed section, it is possible to correct a space between the rolling rolls through measurement of the thickness of the electrode without a separate compensation value table.

Figure 6:
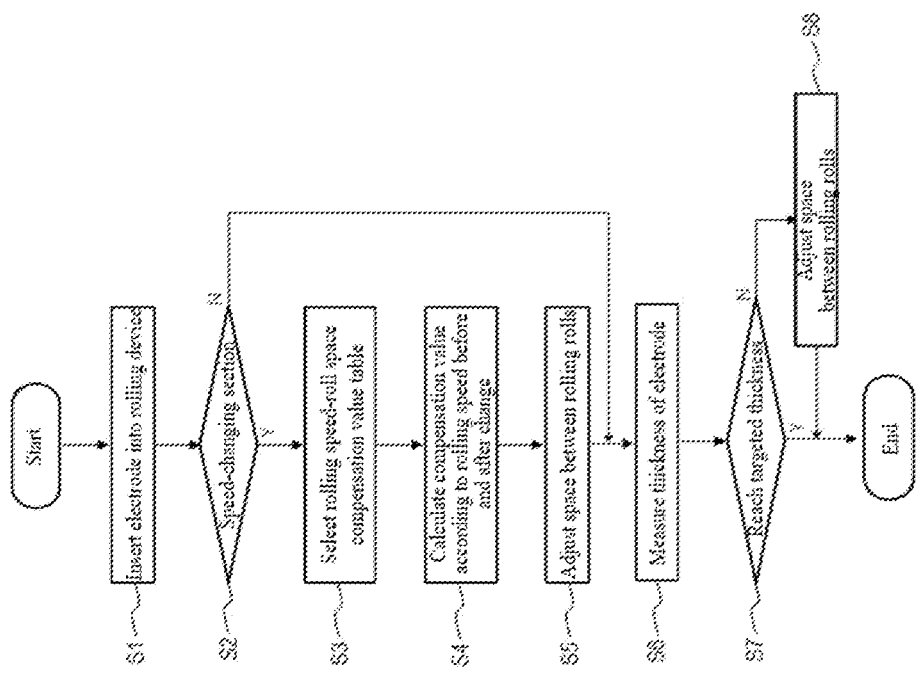
FIG. 6 is a flowchart showing the procedure of a method of rolling an electrode according to another embodiment of the present invention.

FIG. 6 is a flowchart showing the procedure of a method of rolling an electrode according to another embodiment of the present invention.

If the measured thickness is different from a targeted thickness, the space between the rolling rolls is adjusted (S8). Meanwhile, when a section is determined as a speed-changing rolling section, a rolling speed-rolling space compensation value table according to the model is selected (S3), a compensation value is calculated therefrom (S5), and the space between the rolling rolls is then adjusted (S5). When the speed-changing rolling section is finished, the constant-speed rolling section is started. Likewise, it is determined (S7) whether the measured thickness has reached a targeted thickness by measuring the thickness of the electrode (S6), and when the measured thickness is different from the targeted thickness, a process (S8) of adjusting the space between the rolling rolls may be performed.

Likewise, according to the method of rolling an electrode of the present invention, when changing the rolling speed using a rolling speed-rolling space compensation value table, an appropriate compensation value may be selected from the table, and the compensation value may be applied to the control of the space between the rolling rolls. As such, it is possible to maintain the space between the rolling rolls constant in changing the rolling speed of the electrode. As a result, the quality of the electrode can be improved by uniformly maintaining the thickness of the electrode.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Deriving of Rolling Speed-Rolling Space Compensation Value Table>

A negative electrode mixture was prepared by mixing 97.6 parts by weight of artificial graphite and natural graphite that function as negative electrode active materials (weight ratio: 90:10), 1.2 parts by weight of styrene-butadiene rubber (SBR) that functions as a binder, and 1.2 parts by weight of carboxymethyl cellulose (CMC). The negative electrode slurry was prepared by dispersing the negative electrode mixture in ion-exchanged water functioning as a solvent. This slurry was coated on both surfaces of a copper foil having a thickness of 20 μm, which was then dried to thereby manufacture an electrode sample.

The electrode sample was inserted into a rolling device having a structure as shown in FIG. 3, to thereby start rolling. At this time, a process of measuring the space between a first rolling roll and a second rolling roll while increasing or decreasing the rolling speed was repeated several times, to thereby build a database. Further, the same process was repeated using different rolling speeds before the change and the rolling speed after the change. Specifically, the speed section between the minimum speed and the maximum speed was divided into several sections, and the measurement was repeatedly performed for each specific section. Thereafter, a compensation value for minimizing the space change between rolling rolls at the time of the rolling speed change was derived from the database. A rolling speed-rolling space compensation value table, where compensation values for the first rolling roll and the second rolling roll are written, was written as shown in FIG. 5.

Further, a compensation value for minimizing the space change between rolling rolls at the time of electrode roll replacement was derived by repeating the same process while performing a job of replacing the electrode roll during the rolling. The finally obtained rolling speed-rolling space compensation value table is shown in FIG. 5.

<Preparation and Rolling of Electrode>

An electrode was prepared in the same manner as the above-described electrode sample, and the electrode was added to the rolling device. Thereafter, the rolling speed was made to increase from 15 m/min. to 110 m/min. (acceleration section). At this time, the rolling speed was calculated by measuring the distance of the movement of the electrode according to time. Further, the roll space compensation value was calculated from the compensation value table based on the rolling speed change, which was then automatically applied to thereby adjust the space between the rolls. At this time, as a result of summing the compensation values by specific sections, the compensation value for the rolling speed change was calculated as 23 μm.

Further, after the acceleration section, the constant speed section is proceeded, and the rolling speed was reduced (deceleration section), and the space between rolls was adjusted in the same manner as in the acceleration section.

Figure 7A:
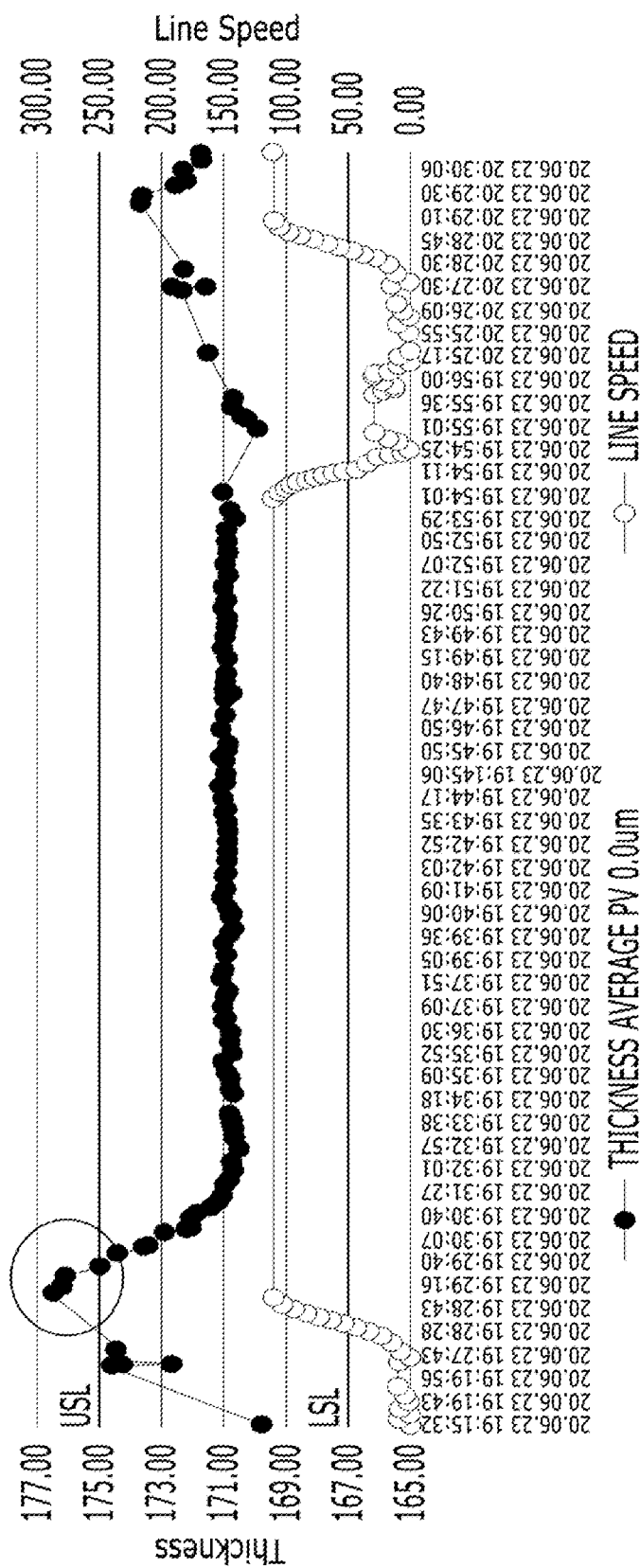
FIG. 7($a$) is a graph showing the rolling speed of an electrode and the thickness of the electrode according to an example.
Figure 7B:
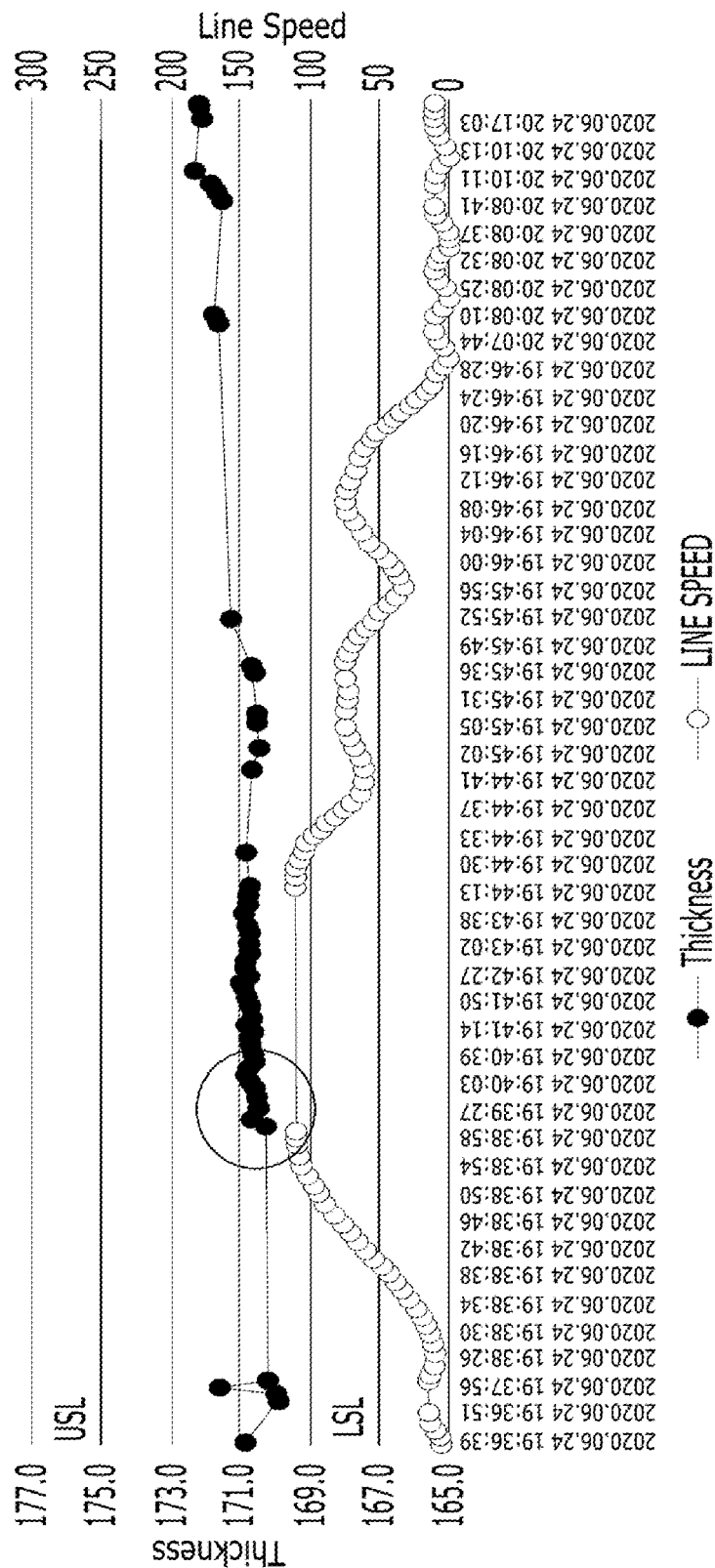

Meanwhile, the thickness of the electrode was measured during the rolling process, and the result was shown in FIG. 7(b). The thickness of the electrode may be measured using a known device such as DCM2 of HUPIA.

Comparative Example 1

An electrode was manufactured and rolled in the same manner as in the example 1 except that a rolling speed-rolling space compensation value table is not derived, and the space compensation value between rolling rolls is not applied in the acceleration section and the deceleration section. The result was shown in FIG. 7(a).

Referring to FIG. 7(b), in the case of the comparative example 1 where the space between the rolling rolls is not compensated according to the change in the rolling speed, the deviation of the thickness of the electrode is large according to the increase and decrease of the rolling speed. On the contrary, in the case of the example 1 where the compensation value, which has been derived from the rolling speed-rolling space compensation value table according to the change in the rolling speed, is applied, the thickness of the electrode is maintained constant despite the change in the rolling speed.

Example 2

A rolling speed-rolling space compensation value table according to the model was written by manufacturing an electrode sample for each model and repeating a process as in the example 1 for the electrode sample. At this time, the electrode sample was manufactured by using different loading amounts and thicknesses of the electrode. A specific rolling speed-rolling space compensation value table was shown in FIG. 8.

In addition, the electrode was prepared in the same manner as the electrode sample, and the rolling speed was raised from about 15 m/min. to 110 m/min. Further, the roll space compensation value was calculated from the compensation value table based on the rolling speed change, which was then automatically applied to thereby adjust the space between the rolls. At this time, as a result of summing the compensation values by specific sections, the compensation value for the rolling speed change was calculated as 20 μm.

Thereafter, the space between the rolling rolls was corrected while measuring the thickness of the electrode in the constant speed section. Thereafter, the rolling speed was reduced from 110 m/min to 15 m/min, and the space compensation value between rolling rolls was calculated in the same manner, which was then automatically applied to thereby adjust the space between the rolls. At this time, the compensation value was calculated as 12 μm.

Figure 9A:
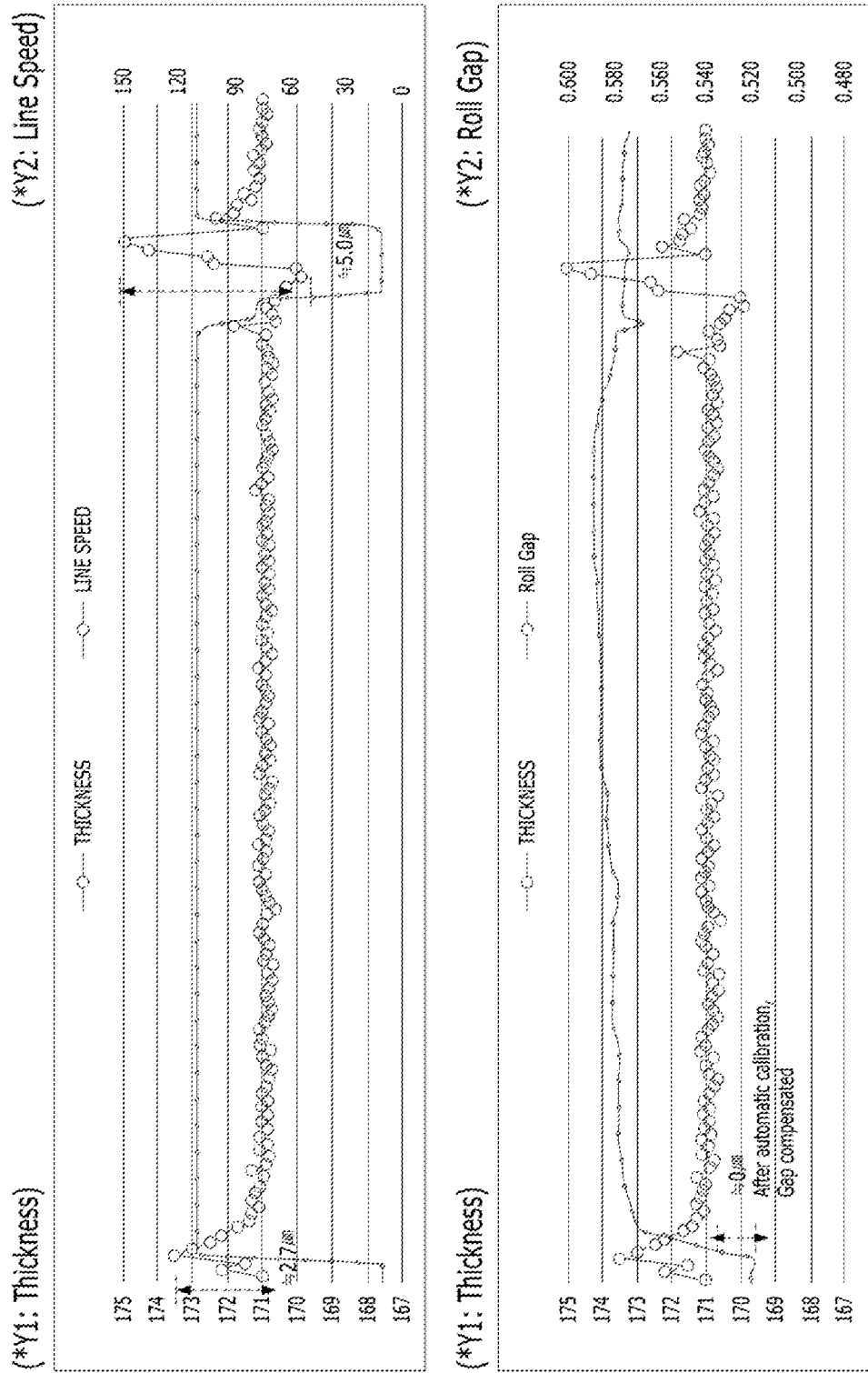
FIG. 9($a$) is a graph showing the rolling speed of an electrode and the thickness of the electrode according to an example.
Figure 9B:
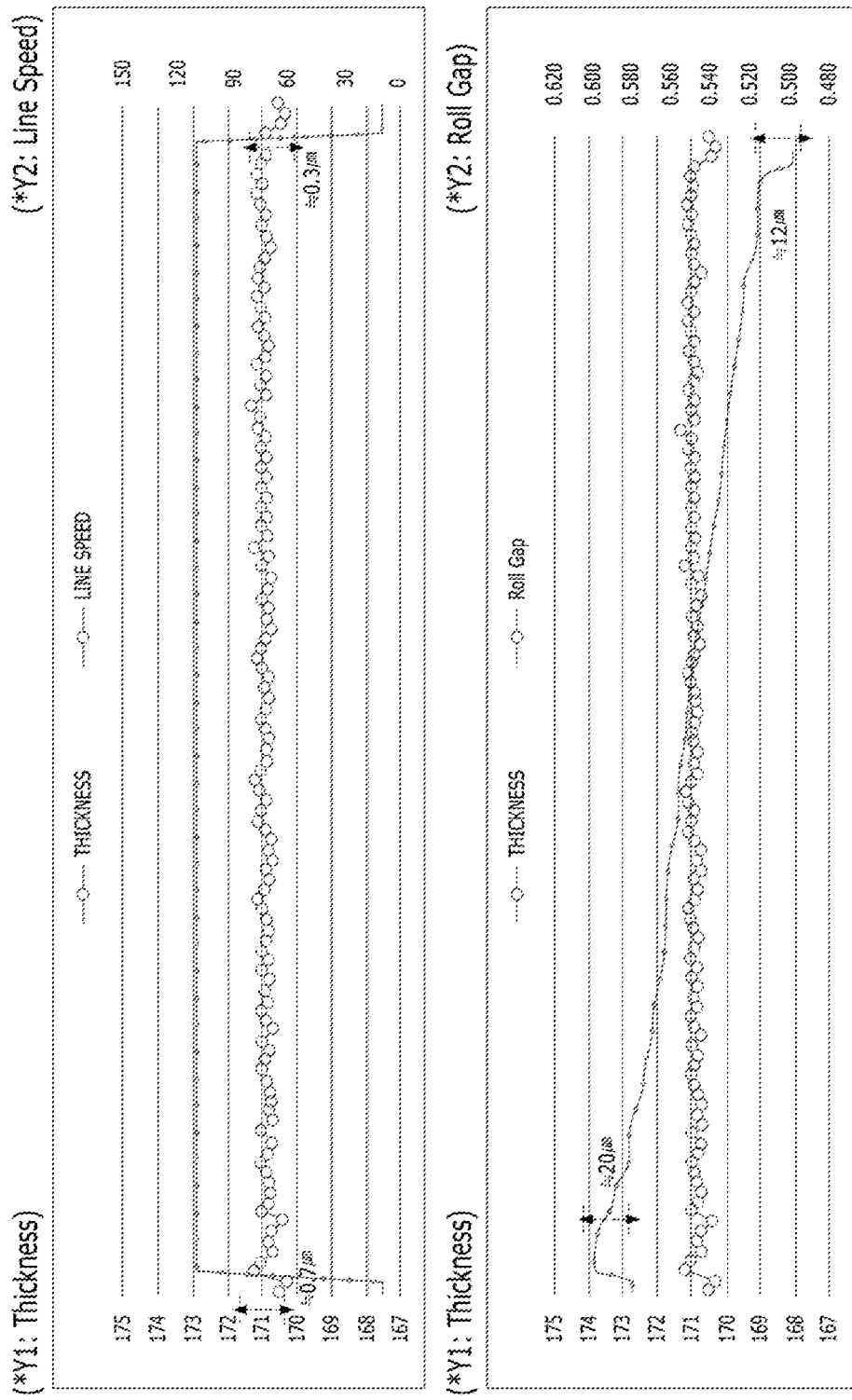

Meanwhile, the thickness of the electrode was measured during the rolling process, and the result was shown in FIG. 9(b).

Comparative Example 2

An electrode was manufactured and rolled in the same manner as in the example 2 except that a rolling speed-rolling space compensation value table is not derived, and the space compensation value between rolling rolls is not applied in the acceleration section and the deceleration section. The result was shown in FIG. 9(a).

Figure 8:
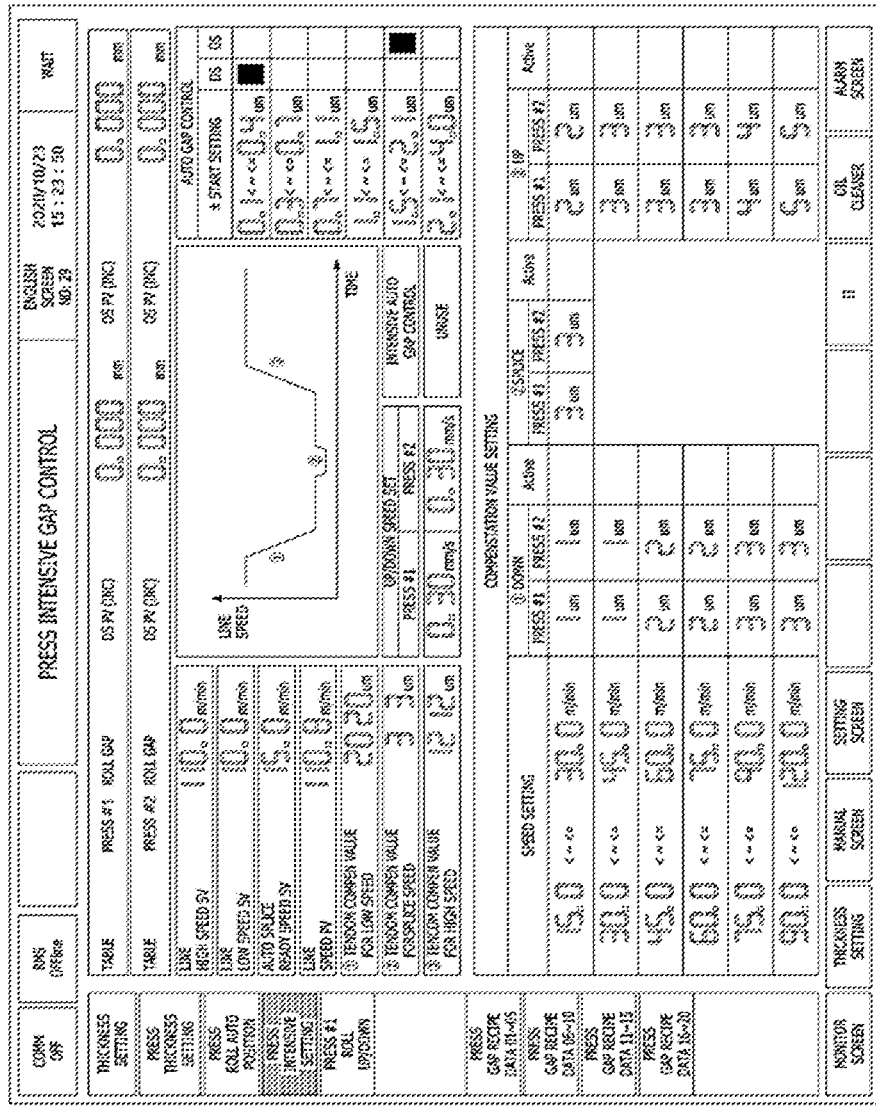
FIG. 8 is a schematic view of another example of a rolling speed-rolling space compensation value table according to the present invention.

Referring to FIG. 8, in the case of the comparative example 2 where the space between the rolling rolls is not compensated according to the change in the rolling speed, the thickness of the electrode increased to 2.7 μm according to the increase of the rolling speed. In addition, it is seen that the thickness change of the electrode is severe in the subsequent deceleration section and the acceleration section.

On the contrary, in the case of the example 2 where the compensation value, which has been derived from the rolling speed-rolling space compensation value table according to the rolling speed change, has been applied, the thickness change of the electrode in the acceleration section was 0.7 μm, and the thickness change of the electrode in the deceleration section was 0.3 μm, which shows that the thickness of the electrode was maintained constant compared to the comparative example 2.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS 1, 10: electrode
2, 11: current collector
3, 12: electrode active material layer
4: rolling roll
20: rolling device
21: first rolling roll
22: second rolling roll

The invention claimed is:

1. A method for rolling an electrode including a speed-changing rolling section, comprising:
   inputting an electrode to a rolling device including at least one pair of rolling rolls; and
   automatically adjusting a space between the rolling rolls according to a space compensation value between the rolling rolls, wherein the space compensation value is determined from a rolling speed change.

2. The method of claim 1, wherein the step of automatically adjusting the space between the rolling rolls includes the step of determining the space compensation value from a rolling speed-rolling space compensation value table.

3. The method of claim 2, wherein in an acceleration section where a rolling speed of the rolling rolls increases, a space between the rolling rolls is made to decrease by a first space compensation value, and
   wherein in a deceleration section where the rolling speed of the rolling rolls decreases, the space between the rolling rolls is made to increase by a second space compensation value.

4. The method of claim 3, wherein the rolling speed-rolling space compensation value table includes space compensation values between rolling rolls for one or more acceleration sections and one or more deceleration sections of the rolling rolls.

5. The method of claim 2, wherein the rolling speed-rolling space compensation value table further includes a space compensation value between rolling rolls for rolling speed changes of the rolling rolls caused by a job performed during the rolling.

6. The method of claim 2, wherein the rolling speed-rolling space compensation value table further includes a space compensation value between the rolling rolls according to a model of an electrode.

7. The method of claim 6, wherein the electrode is different in at least any one of a temperature and dryness, a coating pattern of an electrode active material, a loading amount of the electrode active material, composition of an electrode active material layer, a thickness and porosity.

8. The method of claim 2, wherein the rolling speed-rolling space compensation value table further includes a space compensation value for the at least one pair of rolling rolls.

9. The method of claim 2, wherein the rolling speed-rolling space compensation value table is derived by:
manufacturing an electrode sample;
changing a rolling speed of the electrode sample while rolling the electrode sample;
measuring a space between rolling rolls according to a rolling speed change and building a database therefrom; and
setting a compensation value for obtaining a targeted space from the database.

10. The method of claim 9, further including a step of measuring a space between rolling rolls by changing the rolling speed, and building the database therefrom.

11. The method of claim 9, further including a step of manufacturing electrode samples by models of the electrode and setting a compensation value therefrom.

12. The method of claim 2, wherein the space compensation value between the rolling rolls is determined by selecting a rolling speed-rolling space compensation value table corresponding to a model of an electrode, and calculating compensation values according to rolling speeds before and after the rolling speed change in the rolling speed-rolling space compensation value table.

13. The method of claim 1, further including a step of correcting a space between the rolling rolls in a constant-speed rolling section of the electrode.

14. The method of claim 13, wherein the step of correcting the space between the rolling rolls in the constant-speed rolling section includes measuring a thickness of the electrode and correcting the space between the rolling rolls by a difference between the measured thickness and a targeted thickness when the measured thickness is different from the targeted thickness.

* * * * *